United States Patent [19]

Mizuno et al.

[11] Patent Number: 4,983,854

[45] Date of Patent: Jan. 8, 1991

[54] SHEET DETECTION APPARATUS WITH REFLECTING MEMBER

[75] Inventors: Toshiaki Mizuno, Nagoya; Shinji Kimura, Kani; Toshiaki Sugiura, Hekinan; Mikio Sakuma, Ichinomiya; Tasuku Sugimoto, Seto; Mamoru Imaizumi, Nagoya, all of Japan

[73] Assignee: Brother Kogyo Kabushiki Kaisha, Nagoya, Japan

[21] Appl. No.: 404,862

[22] Filed: Sep. 8, 1989

[30] Foreign Application Priority Data

Sep. 15, 1988 [JP] Japan ................................ 63-231189
Sep. 15, 1988 [JP] Japan ................................ 63-231190

[51] Int. Cl.[5] ............................................ G01N 21/86
[52] U.S. Cl. ................................ 250/561; 250/223 R
[58] Field of Search .................. 250/561, 223 R, 571, 250/559, 560; 356/435, 443, 444, 446, 448; 271/258, 259, 261; 400/708; 355/308, 311

[56] References Cited

U.S. PATENT DOCUMENTS

| | | | |
|---|---|---|---|
| 3,684,890 | 8/1972 | Hayne et al. | 250/561 |
| 3,932,755 | 1/1976 | Sagawa | 250/559 |
| 4,281,244 | 7/1981 | Murata et al. | 250/223 R |
| 4,314,159 | 2/1982 | Davis | 250/561 |
| 4,352,988 | 10/1982 | Ishida | 356/435 |
| 4,540,887 | 9/1985 | Minerd et al. | 250/223 R |
| 4,546,449 | 10/1985 | Masaki et al. | 364/900 |
| 4,585,352 | 4/1986 | Ritzerfeld et al. | 250/559 |
| 4,641,357 | 2/1987 | Satoh | 250/561 |
| 4,723,072 | 2/1988 | Naruse | 250/559 |
| 4,778,296 | 10/1988 | Takahashi | 400/708 |

FOREIGN PATENT DOCUMENTS

| | | |
|---|---|---|
| 0080158 | 11/1982 | European Pat. Off. . |
| 902902 | 10/1958 | United Kingdom . |
| 1164189 | 10/1967 | United Kingdom . |
| 2064101 | 11/1979 | United Kingdom . |
| 2075230 | 4/1980 | United Kingdom . |
| 2066949 | 1/1981 | United Kingdom . |
| 2122743 | 6/1983 | United Kingdom . |
| 2140158 | 4/1984 | United Kingdom . |

*Primary Examiner*—Davis L. Willis
*Assistant Examiner*—Michael Messinger
*Attorney, Agent, or Firm*—Kane, Dalsimer, Sullivan, Kurucz, Levy, Eisele and Richard

[57] ABSTRACT

A sheet detection apparatus is provided which determines the presence or absence of a sheet on a sheet feed path as well as the type of sheet. The apparatus utilizes a light source to direct a predetermined amount of light to a sensor by reflecting off a sheet on the feed path or a reflector in the absence of any such sheet on the path. The presence or absence of the sheet is determined by comparing the output value of the sensor with predetermined reference values.

20 Claims, 15 Drawing Sheets

V
P
VA
V1
VW
VC
V0
V2
VB
O
PAPER ABSENCE
PAPER PRESENCE

FIG. 6

| | PAPER ABSENCE | WHITE | DARK | OHP |
|---|---|---|---|---|
| FIRST SENSOR 4a | $V_A$ | $V_W$ | $V_C$ | $V_A$ |
| SECOND SENSOR 4b | $V_B$ | $V_W$ | $V_C$ | $V_O$ |
| COMPARISON MEANS 21 | $V_1 < V_A$ | $V_1 > V_W$ | $V_1 > V_C$ | $V_1 < V_A$ |
| COMPARISON MEANS 22 | $V_2 > V_B$ | $V_2 < V_W$ | $V_2 > V_C$ | $V_2 < V_O$ |
| SIGNAL A | 1 | 0 | 0 | 1 |
| SIGNAL B | 0 | 1 | 0 | 1 |
| SIGNAL $\bar{A}$ | 0 | 1 | 1 | 0 |
| SIGNAL C ($\bar{A}$ + B) | 0 | 1 | 1 | 1 |
| COMPARISON CONDITION | $V_A > V_1 > \dot{V}_W > V_O > V_2 > V_C > V_B$ | | | |

SHEET DETECTION APPARATUS WITH REFLECTING MEMBER

BACKGROUND OF THE INVENTION

This invention relates to a sheet detection apparatus for detecting a sheet loaded on a printer or typewriter, more particularly, to a sheet detection apparatus using a sensor of light reflection types or a combination of sensor of light reflection type and a transmission type sensor for detecting various types of sheets.

There has been known a sheet detection apparatus using a sensor of light reflection type or a sensor of light transmission type for detecting whether a sheet is present or absent.

In paper detection apparatus which has been known, as shown in FIG. 1, a sensor of light reflection type 91 comprising a light emission element and a light reception element is provided adjacent to a print head 94 on a carriage 95 transversely traveled along a platen 93, as the print head 94 travels, the amount of reflected light being detected, thereby determining whether a paper is present or absent and where it is. In the structure, the platen 93 is positioned on an opposite side of the sensor of light reflection type 91 and the surface of the platen 93 is dark so as to reduce the amount of reflected light when a paper 99 is absent. Namely, platens with dark rubber or aluminum whose surface is painted or coated in dark have been used.

In the structure described above, when the white paper 99 is fed to the platen 93, the carriage 95 which is provided with the sensor of light reflection type 91 travels. When the sensor of light reflection type 91 is located at a position opposed to the white paper 99, the sensor of light reflection type 91 inputs much light compared with a state where the white paper 99 is absent, thereby detecting that the white paper 99 is present.

However, in the paper detection apparatus described above, several practical problems have been pointed out. For example, when the apparatus is used for a long time and the surface of the platen 93 is dirtied by ink or the dark paint applied on the platen 93 is peeled off, the sensor of light reflection type 91 cannot input proper amount of reflected light, whereby the white paper 99 may not be occasionally detected.

In addition, to detect the white paper 99 using reflected light, the color of the surface opposed to the sensor of light reflection type 91 should be dark. Since the surface of the platen 93 has been usually dark, presence or absence of a dark paper or high tone color paper and its position could not have been precisely detected. Moreover, when detecting a transparent film used for overhead projection, it has been impossible to determine whether the transparent film is present or absent and where it is by detecting a change of reflected light like the situation of the dark paper.

Meanwhile, in recording apparatus which has been recently announced, as multiple color printing technologies have advanced, a variety of printing sheet types have been used such as high tone color sheets and dark sheets besides white sheets.

However, in conventional sheet detection apparatus described above, when a variety of sheet types are detected, errors occur because the light reflection factor and light transmission factor depend on the sheet type to be used.

Although it is possible to consider using a mechanical contact type switch which does not use light to detect a sheet, the contacts of the switch have a life restricted by operation time. Therefore, when the contacts do not work due to a long time use, the sheet cannot be detected.

SUMMARY OF THE INVENTION

It is therefore an object of the invention to provide an improved sheet detection apparatus capable of detecting a variety of sheet types which are used for recording apparatus.

For this purpose, according one aspect of this invention there is provided a sheet detection apparatus comprises:

At least two light radiation means for outputting a predetermined amount of light; at least two sensor means provided on a position opposite to a sheet feed path for receiving the light from said light radiation means by way of a sheet, respectively; at least two reflection members provided on opposite sides of said sensor means, respectively, for reflecting the light from said radiation means; and determination means for determining whether one of varioous types of sheet is in existence by comparing output values from said sensor means with predetermined reference values, respectively.

According to another aspect of this invention, there is provided a sheet detection apparatus comprises: at least two light radiation means for outputting a predetermined amount of light; at least two sensor means provided on a position opposite to a sheet feed path for receiving the light from said radiation means by way of a sheet; a reflection member provided on an opposite side of one of said sensor means, said reflection member reflects the light from said sensor means; and determination means for determining whether one of various types of sheet is in existence by comparing output values from said sensor means with predetermined reference values, respectively.

According to still another aspect of this invention, there is provided a sheet detection apparatus comprises: light radiation means for outputting a predetermined amount of light; sensor means provided on a position opposite to a sheet feed path for receiving the light from said light radiation means by way of a sheet; a reflection member provided on an opposite side of said sensor means, said reflection member being alternately formed with portions of high and low reflection factors; carriage means for moving said sensor means transversely on said sheet, wherein the reflected light is in an alternately changing state in which the reflected light of high and low level are alternately inputted to said sensor means, when said carriage means is moved in non-sheet loaded state; and determination means for determining whether one of various types of sheets is in existence in accordance with said reflected light inputted to said sensor means.

DESCRIPTION OF THE ACCOMPANYING DRAWINGS

Figure 7:
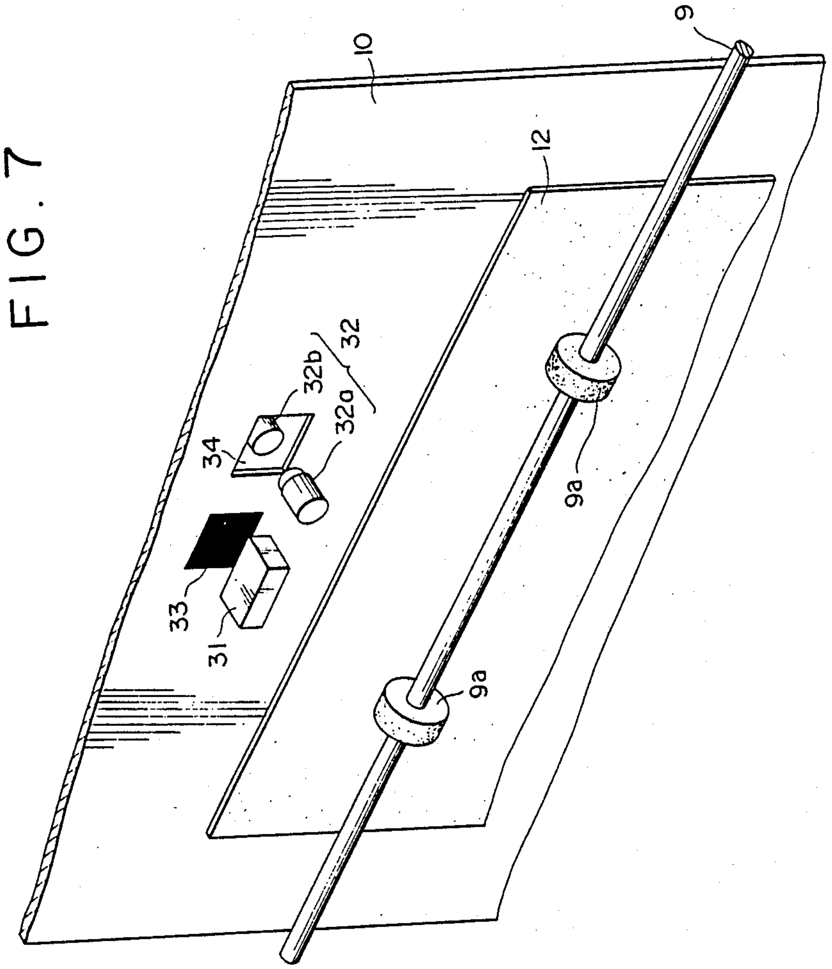
Figure 8A:
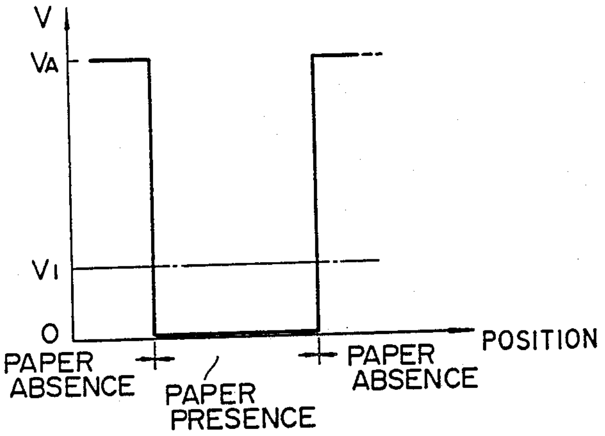
Figure 8B:
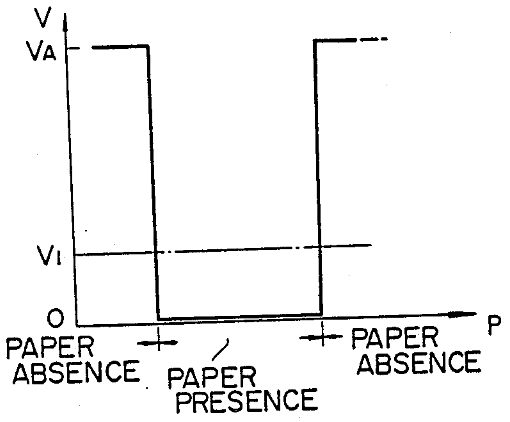
Figure 8C:
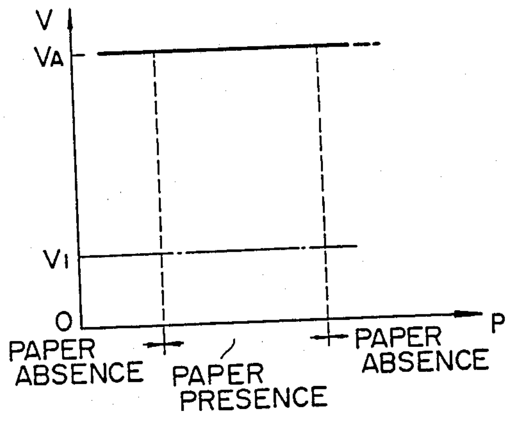
Figure 8D:
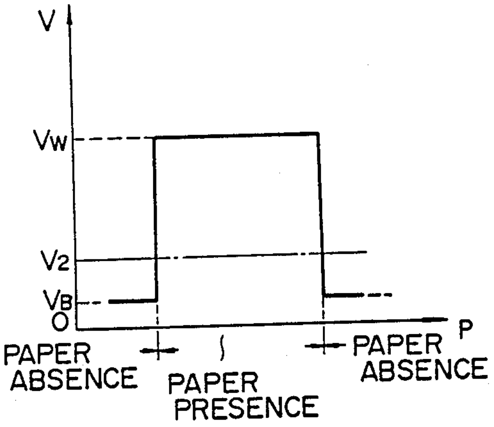
Figure 8E:
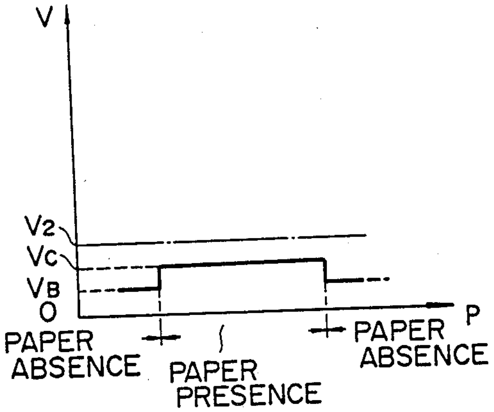
Figure 8F:
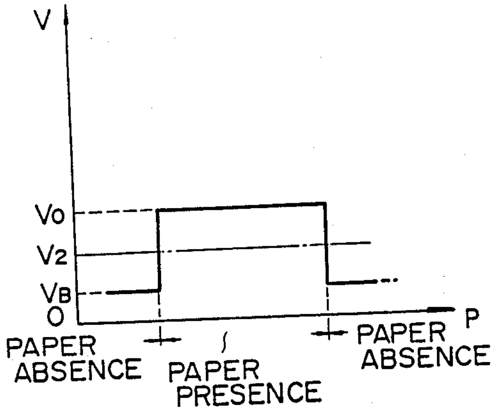
Figure 9:
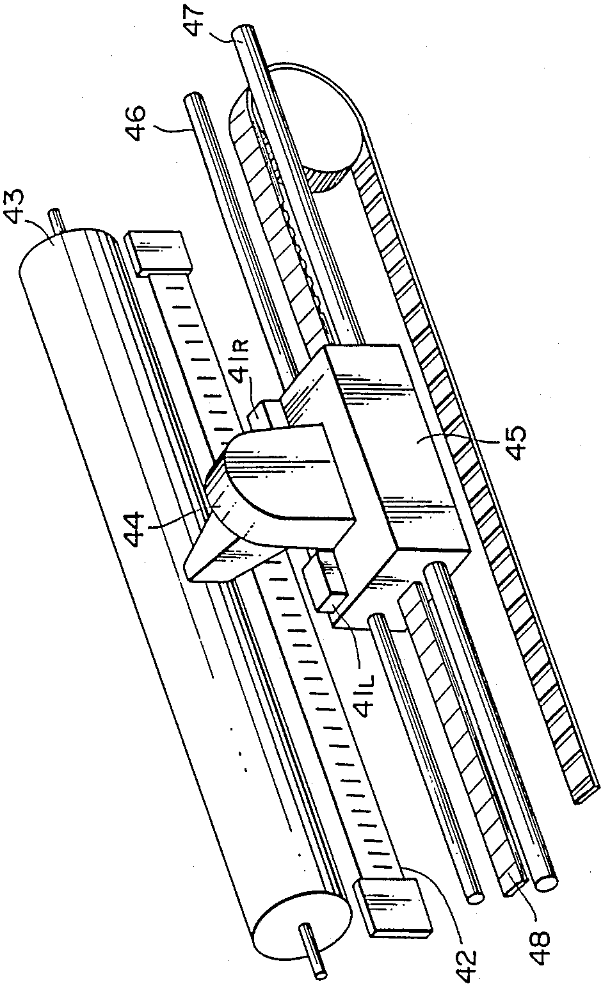
Figure 10:
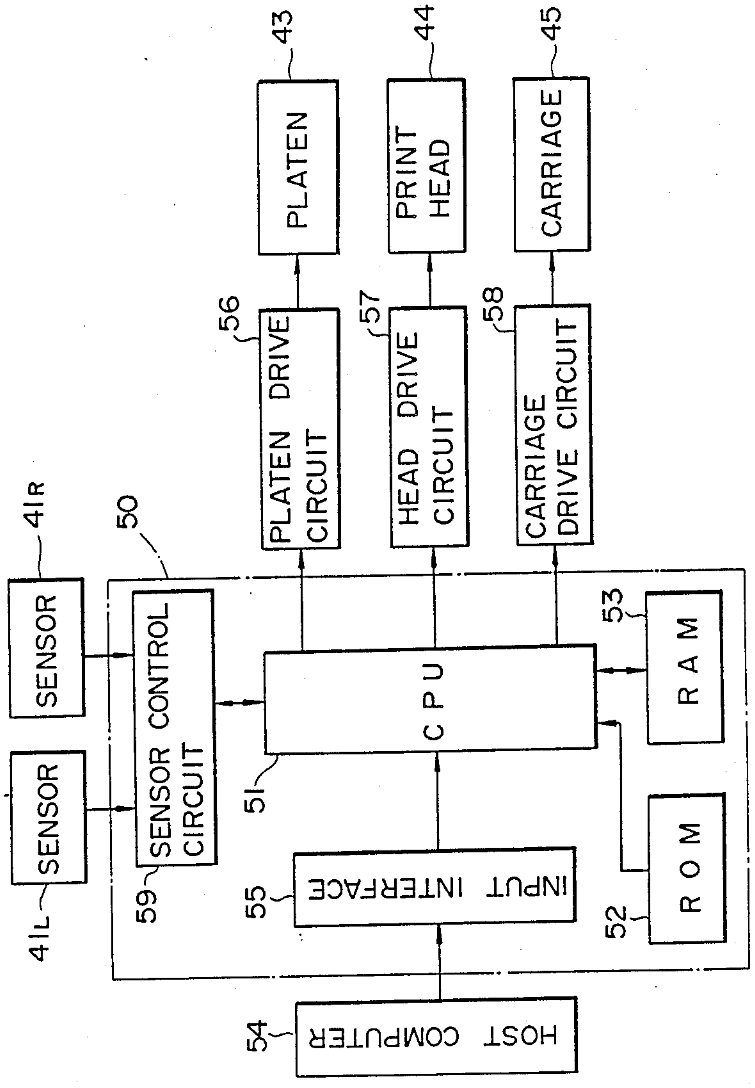
Figure 11:
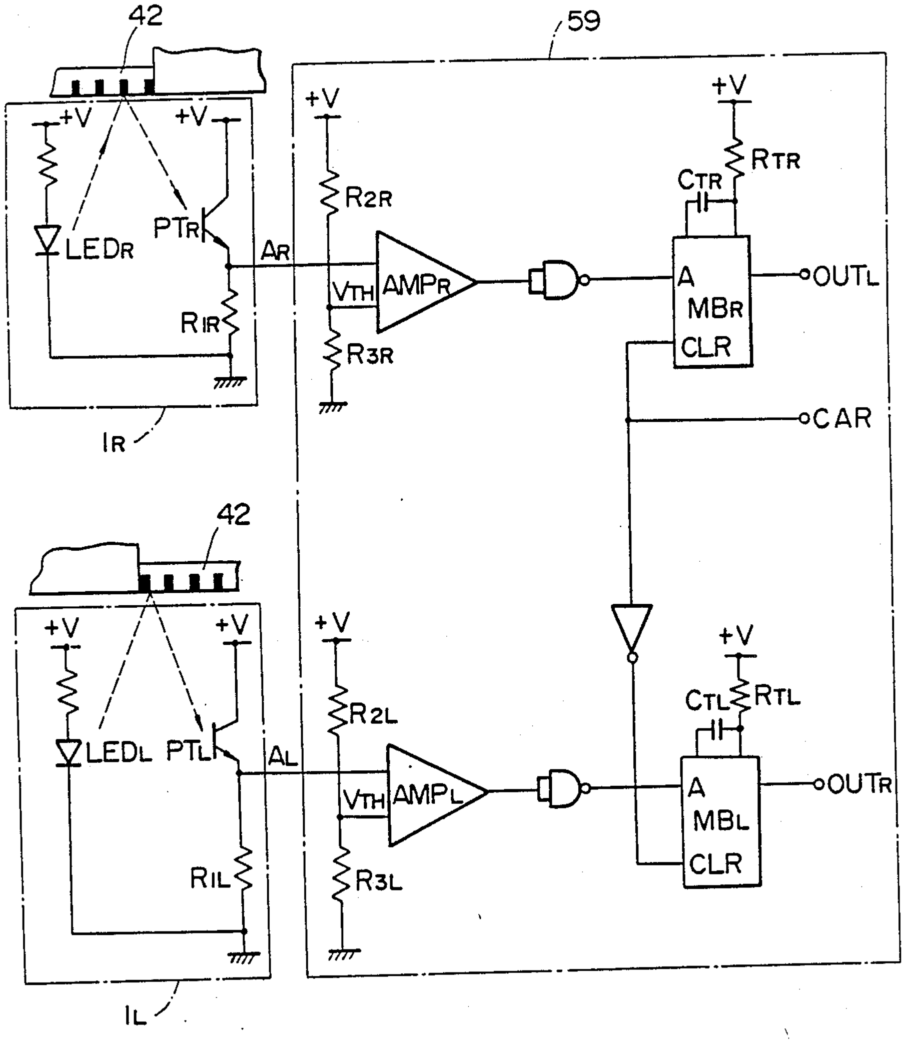
Figure 12:
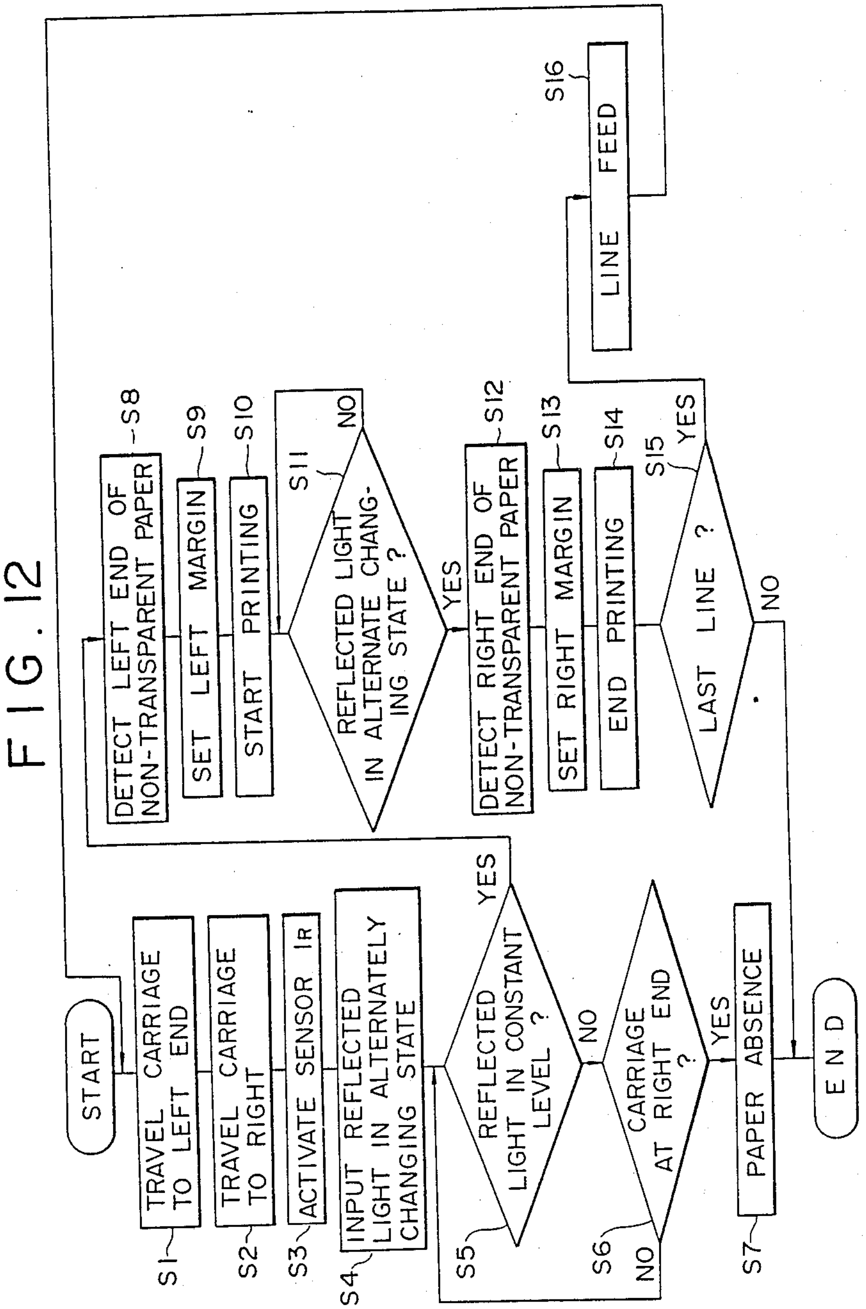
Figure 13A:
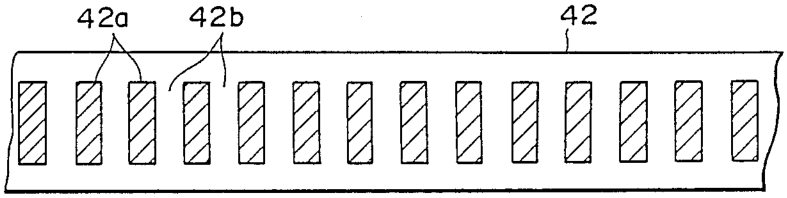
Figure 13B:
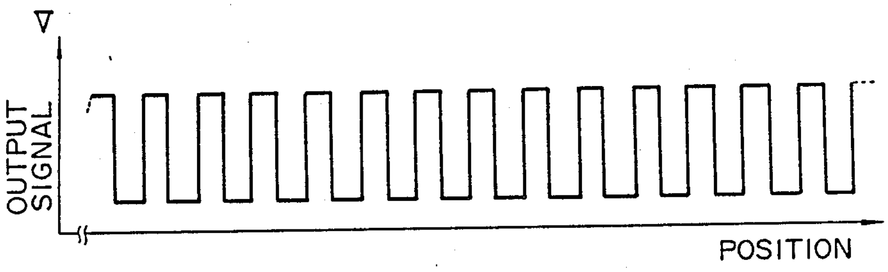
Figure 14A:
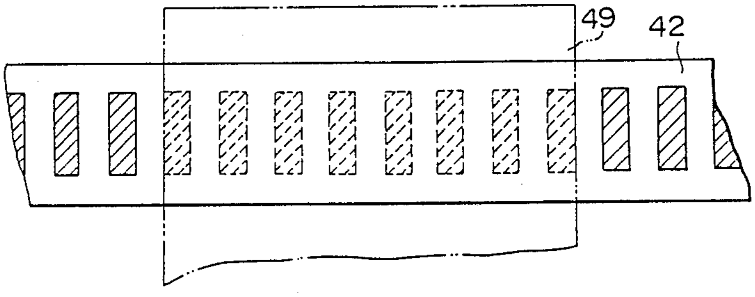
Figure 14B:
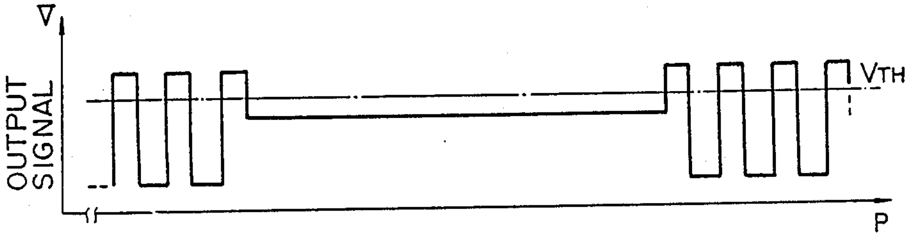
Figure 14C:
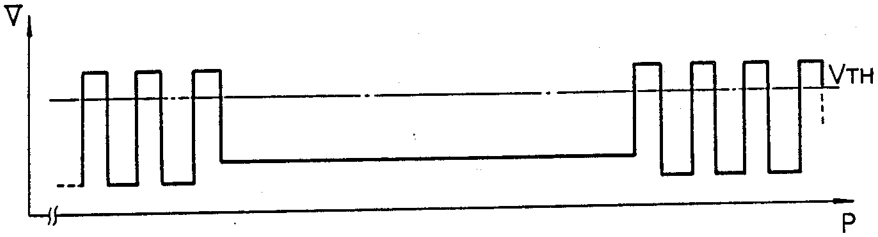
Figure 14D:
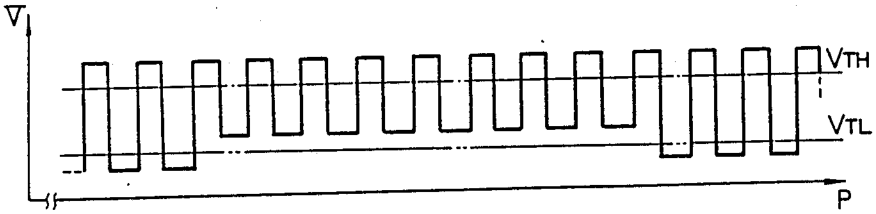

FIGS. 5*a*, 5*b*, 5*c*, 5*d*, 5*e*, and 5*f* are diagrams showing comparisons of output values;

FIG. 6 is a diagram showing a process of determining the sheet presence;

FIG. 7 is a perspective view of sheet detection apparatus according to the second embodiment;

FIGS. 8*a*, 8*b*, 8*c*, 8*d*, 8*e*, and 8*f* are diagrams showing comparisons of output values;

FIG. 9 is an outlined perspective view of a printer according to the third embodiment of this invention;

FIG. 10 is a block diagram showing the structure of the printer according to the third embodiment of this invention;

FIG. 11 is an electric circuit diagram of a sensor and sensor control circuit of the printer according to the third embodiment of this invention;

FIG. 12 is a flowchart showing an operation of the printer according to the third embodiment of this invention; and FIGS. 13(*a*) and 13(*b*), and 14*a*, 14*b*, 14*c*, and 14*d* are diagrams showing operations of the printer according to the third embodiment of this invention.

DESCRIPTION OF THE EMBODIMENTS

Figure 1:
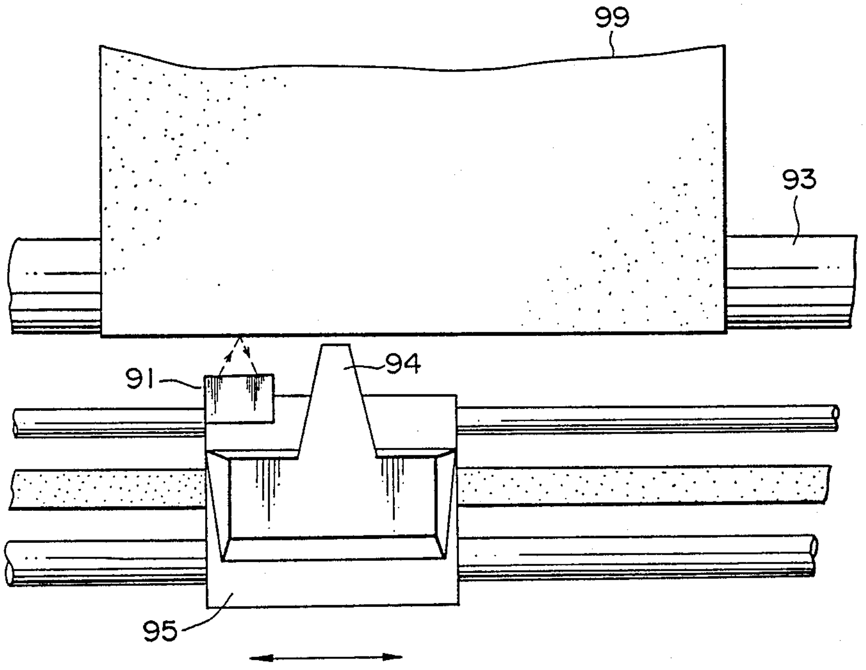
FIG. 1 PRIOR ART
FIG. 1 is a perspective view of printer which is provided with conventional paper detection apparatus.
Figure 2:
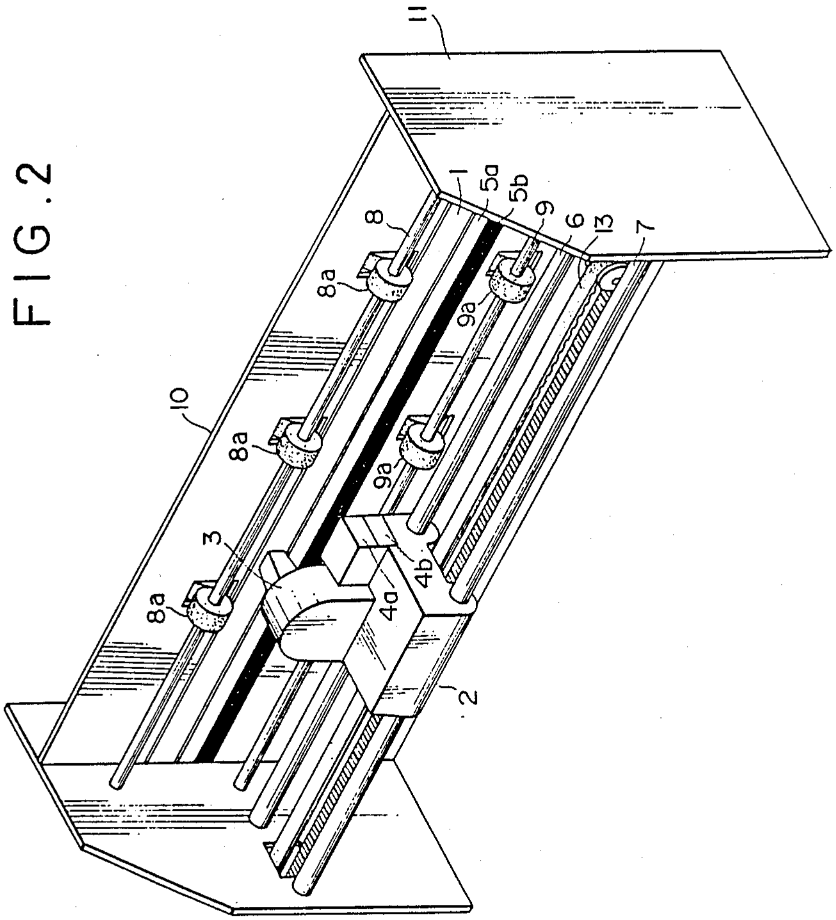
FIG. 2 is an outlined perspective view of a printer according to the first embodiment of the present invention.
Figure 3:
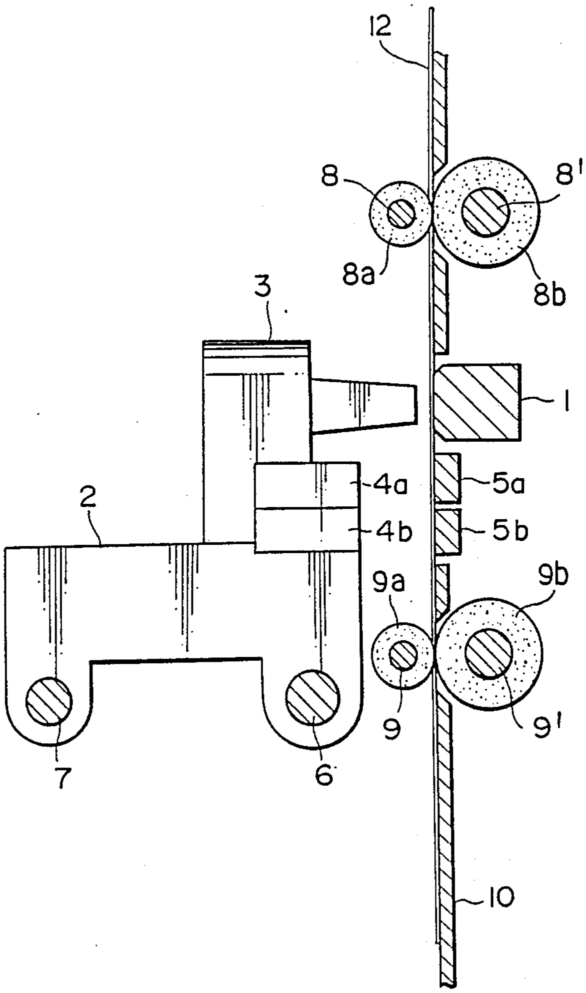
FIG. 3 is a sectional center view of a printer according to the second embodiment of the present invention.

FIGS. 2 and 3 are an outlined perspective view of a printer having sheet detection apparatus according to the present invention and a sectional side view thereof, respectively.

The printer is provided with an aluminum platen 1 on a frame chassis 11, on the front side of the platen 1 a carriage 2 being supported slidably on a main guide bar 7 and a side guide bar 6, the carriage 2 being movable transversely by a well-known carriage drive step motor (not shown) through a drive belt 13 along the platen 1.

The carriage 2 is provided with first and second sensor of light reflection types 4*a* and 4*b* and a print head 3.

On the frame chassis 11, upper pinch roller shafts 8 and 8' and lower pinch roller shafts 9 and 9' are rotatably supported. The upper pinch roller shaft 8 and the lower pinch roller shafts 9 are rotated by a well-known line feed motor (not shown). The upper and lower pinch roller shafts 8, 8', 9 and 9' are provided with a plurality of pinch rollers 8*a*, 8*b*, 9*a* and 9*b* so as to feed a paper along a paper guide plate 10 forming a paper feed path.

First and second reflection plates 5*a* and 5*b* adjacent to the platen 1 are provided on opposites sides of the first and second reflection type sensors 4*a* and 4*b* disposed on the carriage 2.

The first reflection plate 5*a* is made of a lustrous aluminum plate whereby the reflection factor of the surface thereof is higher than that of a white paper. On the second reflection plate 5*b*, a dark delustrous paint which prevents light from being reflected is coated whereby the reflection factor of the surface thereof becomes lower than that of the surface of a transparent film used for the over head projector (referred to simply as an OHP paper in the succeeding description).

The first and second sensor of light reflection types 4*a* and 4*b* cooperating with the carriage 3 which travel transversely are provided on opposite sides of the first and second reflection plates 5*a* and 5*b*, respectively. Each of the sensor of light reflection types 4*a* and 4*b* has a well-known light source, a well-known light reception element, and a well-known photoelectric converter (which are not shown) whereby the light source radiates light, the light reception element receives the light being reflected by the reflection plate, and the photoelectric converter converts it into a voltage to be output.

An operation of the paper detection apparatus of the first embodiment as structured above is described in the following.

$V_1$ and $V_2$ are reference values according to output voltages of the first and second sensors $4_A$ and $4_B$. In this embodiment, the reference value $V_1$ is set in the range between an output voltage $V_A$ at which the first sensor 4*a* receives reflected light from the first reflection plate 5*a* and an output voltage $V_W$ at which it receives that from a white paper. On the other hand, the reference value $V_2$ is set in the range between an output voltage $V_B$ at which the second sensor 4*b* receives reflected light from the reflection plate 5*b* and an output voltage $V_O$ at which it receives that from an OHP paper. Output voltages from the first and second sensors 4*a* and 4*b* are compared with the reference values $V_1$ and $V_2$ in comparison means 21, 22. When the output voltage from the sensor is higher than the reference value, "1" is output; when the output voltage from the sensor is lower than the reference value, "0" is output. It is determined whether a paper is present or not using the "1" and "0" signals from the logical circuit. When a paper has not been loaded on the printer, the carriage 3 which is provided with the first and second sensor of light reflection types 4*a* and 4*b* is moved along the platen 1. The first and second sensor of light reflection types 4*a* and 4*b* radiate light toward the reflection plates, receive reflected light, and output output voltages corresponding to the amount of light. At the time, since the first sensor of light reflection type 4*a* receives the reflected light from the first reflection plate 5*a*, it outputs the output voltage $V_A$. On the other hand, the second sensor of light reflection type 4*b* receives reflected weak light from the second reflection plate 5*b* and then outputs the output voltage $V_B$. It is compared that the output voltage $V_A$ with the reference value $V_1$. Since $V_A > V_1$, the comparison means 21 outputs "1" as an output signal A. Then, it is compared that the output voltage $V_B$ with the reference value $V_2$. Since $V_B < V_2$, the comparison means 22 outputs "0" as an output signal B. The output signal A is put through a NOT circuit (namely, "0"), then put through an OR circuit with the output signal B (namely, "0"), and then "0" is outputted as an output signal C. If the output signal C is "0", no paper exists in the printer.

Figure 4:
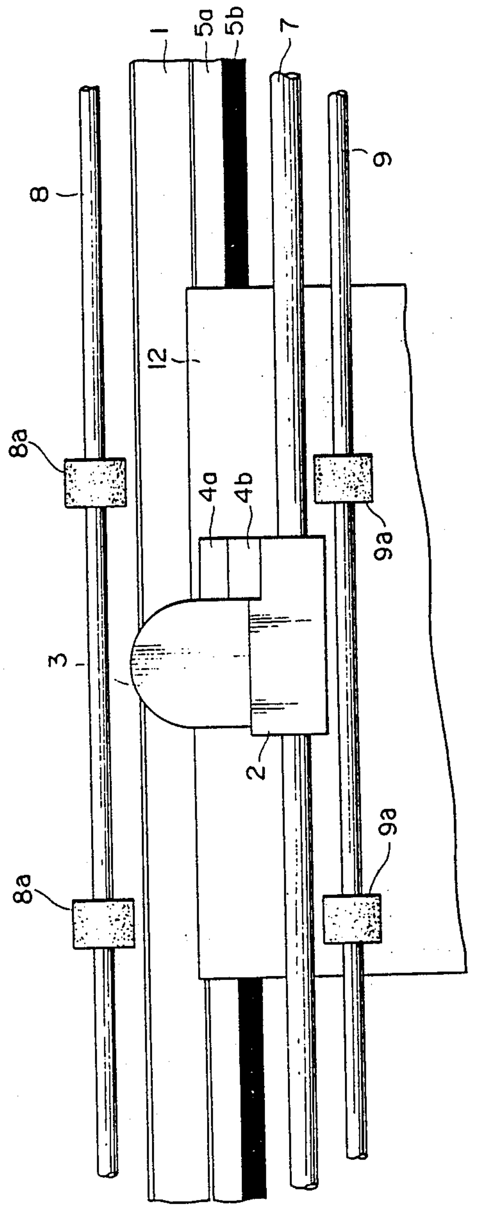
FIG. 4 is an outlined front view of the printer according to the second embodiment of the present invention.
Figures 5A, 5B, 5C, 5D, 5E, 5F:
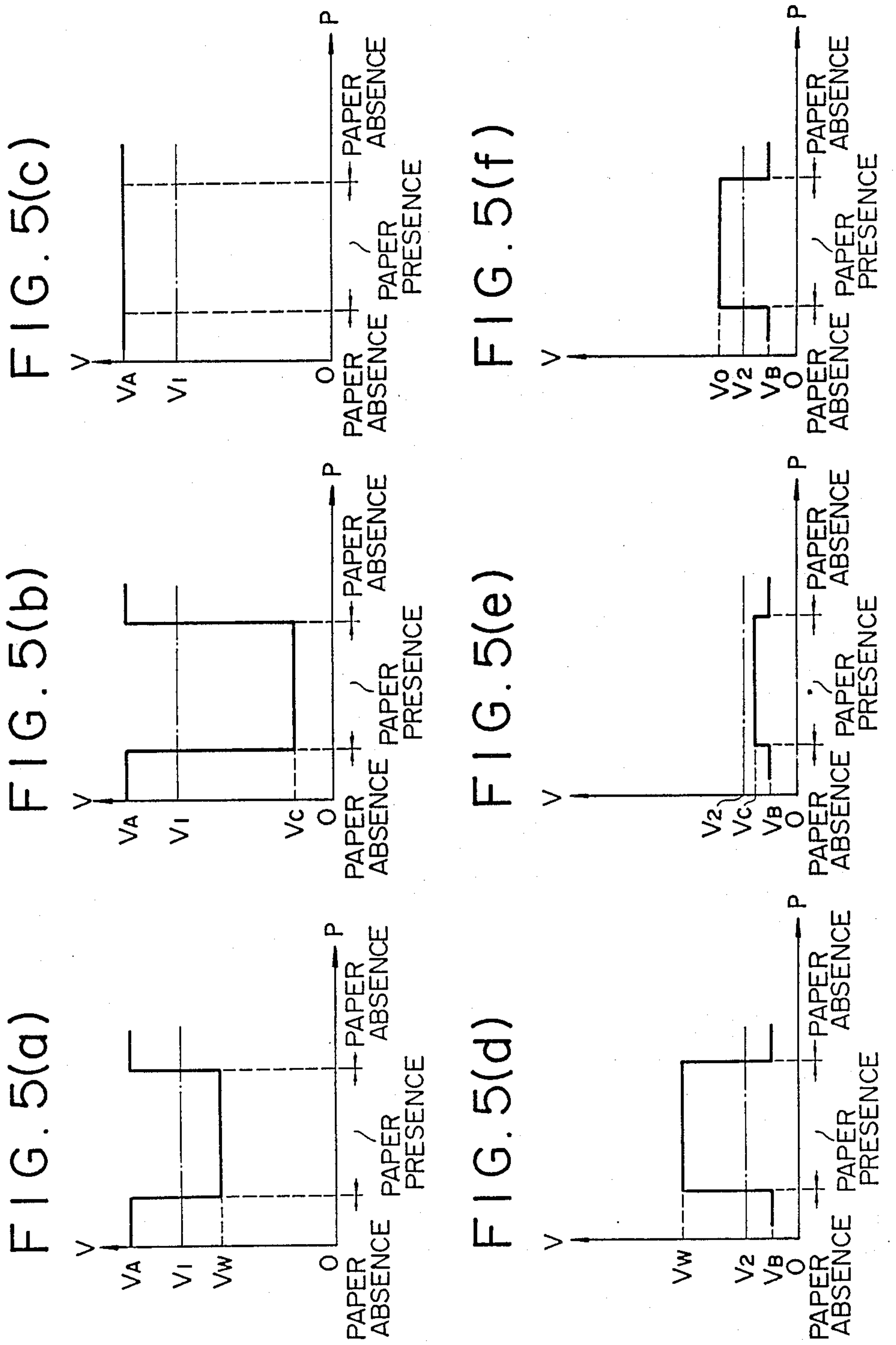

When a paper is fed to the printer and then sent by the pinch roller along the paper guide, as shown in FIG. 4, a state where a paper 12 exists at the detection positions of the first and second sensor of light reflection types takes place. At the time, like the state where no paper exists describe above, by traveling the carriage 2. the first and second sensors 4*a* and 4*b* detect that the paper exists. When the result of paper detection is changed, namely, when the state is changed from the paper absence state to the paper presence state or vice verse, the left and right ends of the paper are detected in accordance with the number of steps for which the carriage drive step motor rotates.

For the printer according to the first embodiment, besides conventional white papers, high tone color papers, dark papers, and transparent OHP papers can be used. An operation for detecting various types of papers, particularly, white papers, dark papers, and OHP papers by the paper detection apparatus according to the present embodiment is described.

FIGS. 5(*a*) through 5(*f*) show comparisons between output voltages of the first and second sensor of light reflection types 4 depending on whether a paper exists or not and the reference values $V_1$ and $V_2$, thereof. The abscissa shows the position of a sensor. FIGS. 5(*a*) and 5(*c*) show the output voltages of the first sensor of light reflection type. FIGS. 5(*d*) through 5(*f*) show the output voltages of the second sensor of light reflection type. FIGS. 5(*a*) and 5(*d*) show the output voltages depending on whether a white paper exists or not. FIGS. 5(*b*) and 5(*e*) show the output voltages depending on whether a dark paper exists or not. FIGS. 5(*c*) and 5(*f*) show the output voltages depending on whether an OHP paper exists or not.

In FIGS. 5(*a*) through 5(*f*), when no paper exists, because the reflection factor of the first reflection plate **5*a* is set to a higher value than that of the white paper, the output voltage from the first sensor of light reflection type 4*a* becomes a higher value $V_A$ than the output value $V_W$ which is output when the white paper is detected. In addition, because the reflection factor of the second reflection plate 5*b* is set to a lower value than that of the OHP paper, the output voltage from the second sensor of light reflection type 4*b* becomes a lower value $V_B$ than the output value $V_O$ which is output when the OHP paper is detected. The output values of the first and second sensor of light reflection types 4*a* and 4*b* are $V_W$ when a white paper is detected and $V_C$ which is slightly higher than $V_B$ when a dark paper is detected, respectively. When an OHP paper exists, light from the sensor is transmitted therethrough, reflected on the reflection plate and then received to the sensor. Therefore, the reflection factor of the reflection plate provided on the rear side of the OHP paper should be considered. In other words, the light from the first sensor 4*a* is partially reflected on the OHP paper. The other is transmitted through the OHP paper, reflected on the surface of the first reflection plate 5*a* which has a high reflection factor, and then transmitted therethrough. Actually, the amount of light received by the first sensor 4*a* is nearly equal to that of which no paper exists. Therefore, the output value where the first sensor 4*a* and the OHP paper are opposed is equal to the output value $V_A$ for which no paper exists. On the other hand, since the second sensor 4*b* and the second reflection plate 5*b* are on opposite sides of the second reflection plate 5*b* which has a low reflection factor, when the second sensor 4*b* is opposed to the OHP paper, the output value becomes $V_O$ which accords with the amount of light reflected only by the surface of the OHP paper. The reference values $V_1$ and $V_2$ are set in the range between $V_A$ and $V_W$ and between $V_O$ and $V_B$. Therefore, the order of the output values from the first and second sensors 4*a* and 4*b*** and reference values is represented as follows:

$$V_A > V_1 > V_W > V_O > V_2 > V_C > V_B \qquad \text{(See FIG. 6)}$$

FIG. 6 shows a process for determining whether a paper exists or not by comparing above output values with the reference values.

When no paper exists, the first sensor **4*a* and the second sensor 4*b* output the values $V_A$ and $V_B$, respectively. It is compared that the output value $V_A$ from the first sensor 4*a* with the reference value $V_1$. Since the result is $V_1 < V_A$, namely, the output value is larger than the reference value, a comparison means 21 outputs "1" as the output signal A. It is compared that the output value $V_B$ from the second sensor 4*b* with the reference value $V_2$. Since the result is $V_2 > V_B$, namely, the output value is smaller than the reference value, a comparison means 22** outputs "0" as the output signal B. The output signal A is put through the NOT circuit (namely, "0"), put through the OR circuit with the output signal B (namely, "0"), and then "0" is outputted as the output signal C; and it is determined that no paper exists.

When a white paper is present at the detection position, the output values from the first and second sensors **4*a* and 4*b*** become $V_W$. The output values are compared with the reference values and output "0" as the signal A and "1" as the signal B. A logical operation is performed and "1" is outputted as the output signal C; and it is determined that the paper is present.

When a dark paper is present at the detection position, the output values from the first and second sensors **4*a* and 4*b*** become $V_C$. The output values are compared with the reference values and "0" is outputted as the signal A and "0" as the signal B. A logical operation is performed and "1" is outputted as the signal C, thereby it is determined that the paper is present.

When an OHP paper is present at the detection position, the output values from the first and second sensors **4*a* and 4*b* become $V_A$ and $V_O$, respectively. The output values are compared with the reference values and the comparison means 21 outputs "1" as the signal A; the comparison means 22** outputs "1" as the signal B. A logical operation is performed and "1" is outputted as the signal C; it is determined that the OHP paper is present.

In the first embodiment of the present invention, when a paper does not exist, the first output value from the first sensor of light reflection type is higher than that of the first reference value. The second output value from the second sensor of light reflection type is lower than the second reference value. When a white paper is fed to the detection position, the first output value becomes lower than the first reference value, the second output value becoming higher than the second reference value. When a dark paper is fed, the first output value becomes lower than the first reference value, the second output value becoming lower than the second reference value like the state where no paper exists. When an OHP paper is fed, the first output value becomes higher than the first reference value like the state where no paper exists, the second output value becoming higher than the second reference value. The detection means detects that a paper exists when the first output value becomes lower than the first reference value or when the second output value becomes higher than the second reference value.

Moreover, in the first embodiment of the present invention, the first and second sensor of light reflection types are provided on the carriage which transversely travels on a paper, thereby detecting the left and right ends of the paper. However, it is also possible to fixedly provide both the sensors at predetermined positions adjacent to the paper feed path and to provide two reflection members on opposite sides thereof so as to only detect whether a paper is present or absent; and it is also possible to substitute the platen 1 for at least one of the first and second reflection plates.

Referring to attached drawings, the second embodiment of the present invention is described in the following. The same portions as the first embodiment in structure are omitted in the following description.

FIG. 7 is a perspective view of paper detection apparatus and thereabout of recording apparatus according to the paper detection apparatus of the second embodiment.

Although the structure of the recording apparatus of the second embodiment is nearly same as that of the first embodiment, the recording apparatus of the second embodiment is not provided with the first and second sensor of light reflection types 4*a* and 4*b* and the first and second reflection plates 5*a* and 5*b*.

On the lower side of the platen 1, two sensors are provided: one is a sensor of light reflection type 31 provided on an opposite side of the paper guide plate 10 forming a paper feed path and the other is a sensor of light transmission type 32 composed of a light emission element 32*a* and a light reception element 32*b* which are provided on opposite sides of the paper guide plate 10 through a window portion 34 provided thereon. Part of the paper guide plate 10 opposed to the sensor of light reflection type 31 is delustrously painted in dark, the portion being a reflection portion 33 on an opposite side of the sensor of light reflection type 31. Namely, since the surface of the reflection member 33 is delustrously painted in dark, the reflection factor thereof is smaller than that of an OHP paper. The sensor of light reflection type 31 and the sensor of light transmission type 32 are securely supported with a well-known supporting member (not shown) so that they are in parallel with the end of a paper 12 being fed by the pinch rollers 9*a*, 9*a* on the lower pinch roller shaft 9.

Referring to FIG. 3, the paper detection apparatus of the second embodiment is described because it is nearly same as the first embodiment in structure.

In the paper detection apparatus according to the second embodiment, the sensor of light transmission type 32 and the sensor of light reflection type 31 are provided instead of the first sensor 4*a* and second sensor 4*b*, respectively. In addition, in the second embodiment, the reference values $V_2$ for the sensor of light reflection type 31 is nearly same as that in the first embodiment. The reference value $V_1$ for the sensor of light transmission type 32 is set in the range between the output value $V_A$ from the sensor of light transmission type 31*b* at which light is radiated from the light emission element 32*a* to the light reception element 32*b* and an output value at which no light is radiated to the light reception element 32*b*, namely, "0". (See FIG. 8(*a*))

An operation of the second embodiment of the present invention in the structure described above is described in the following.

FIGS. 8(*a*) through 8(*f*) show comparisons between output voltages of the sensor of light transmission type 32 and the sensor of light reflection type 31 depending on whether a paper exists or not and the reference values $V_1$ and $V_2$. The abscissa shows the position of a sensor. FIGS. 8(*a*) and 8(*c*) show the output voltages of the sensor of light transmission type 32. FIGS. 8(*d*) through 8(*f*) show the output voltages of the sensor of light reflection type 31. FIGS. 8(*a*) and 8(*d*) show the output voltages depending on whether a white paper exists or not. FIGS. 8(*b*) and 8(*e*) show the output voltages depending on whether a dark paper exists or not. FIGS. 8(*c*) and 8(*f*) show the output voltages depending on whether an OHP paper exists or not.

Since the sensor of light reflection type 31, the reflection member 33, and the reference value $V_2$ in the second embodiment are the same as the second sensor of light reflection type 4*b*, the second reflection plate 5*b*, and the reference value $V_2$ in the first embodiment, respectively, the output values and the reference values in comparisons are same. Thus, FIGS. 8(*d*) and 8(*f*) show the same results as in FIGS. 5(*d*) and 5(*f*) in the first embodiment. When FIGS. 8(*a*) and 8(*c*) and FIGS. 5(*a*) and 5(*c*) are compared, the output values from the sensors for determining whether a paper is present or not are identically changed against the reference value $V_1$. Therefore, the results of the comparisons in the second embodiment are same as those in the first embodiment. It is obvious that the second embodiment can detect whether various types of papers are present or not.

In the second embodiment of the present invention, when no paper exists, the first output value from the sensor of light reflection type is lower than the first reference value, the second output value from the sensor of light transmission type being higher than the second output value. When a white paper is fed at the detection position, the first output value becomes higher than the first reference value, the second output value becoming lower than the second reference value. When a dark paper is fed, the first output value becomes lower than the first reference value like the state where no paper exists, the second output value becoming lower than the second reference value. When an OHP paper is fed, the first output value becomes higher than the first reference value, the second output value becoming higher than the second reference value like the state where no paper exists. The determination means determines that a paper exists when the first output value becomes lower than the first reference value or when the second output value becomes higher than the second reference value.

Although in the first and second embodiments of the present invention, whether a paper is present or not and where it is were determined by comparing the output values from the first and second sensors with the predetermined reference values, since the signals depend on the types of papers, it is possible to determine the types of paper in accordance of the signals. Particularly, by considering that the fixation of ink or toner depends on the type of a paper, it is necessary to slightly change the recording method so as to obtain a clean recording result.

In addition, because the apparatus does not use mechanical contacts and the like, it provides a high durability.

FIG. 9 is an outlined perspective view of the third embodiment of the present invention. In the printer, a platen 43 is rotatably supported to a frame (not shown). On the front side of the platen 43, a carriage 45 supported by two carriage rails 46 and 47 is movably provided along the platen 43. The carriage 45 is transversely traveled though a drive belt 48 by a carriage drive motor (not shown), the carriage 45 being provided with an ink jet type print head 44 and two sensor of light reflection types $41_L$ and $41_R$ which sandwich the print head 44. On the lower side of the platen 43, a reflection plate 42 is on an opposite side of the sensor $41_L$ and $41_R$, the reflection plate 42 being supported on the frame. As shown in FIG. 13 (*a*) which is an enlarged view of the reflection plate 42 wherein the surface of an aluminum plate has two types of stripes: one type is bright stripes 42*a* whose reflection factor is high and the other type is dark stripes 42*b* whose light reflection factor is low which are alternately placed in an equal width. The reflection plate 42 is made by printing equal width stripes on an aluminum plate whose reflection factor is very high with a dark paint whose reflection factor is very low using silk print method.

FIG. 10 is a block diagram showing the structure of the printer. Control means 50 for controlling the printer is provided with a known CPU 51 (central processing unit), a ROM 52 (read only memory) for storing a program and so forth which controls the printer, a RAM 53 (random access memory) for storing various data to be rewritten, an input interface 55 for inputting data from a host computer 54, and a sensor control circuit 59 for controlling the sensors $41_L$ and $41_R$. The CPU 51 is connected to a platen drive circuit 56 for driving the platen 3 through a well-known platen drive motor (not shown), a head drive circuit 57 for driving the print head 44, and a carriage drive circuit 58 for driving the carriage 45 through the carriage drive motor so as to control them.

FIG. 11 is an electric block diagram of the sensors $41_R$ and $41_L$ and the sensor control circuit 59. Since the structure of the sensor $41_R$ is the same as that of the sensor $41_L$, in the following description, only the sensor $41_L$ is described. The sensor $41_L$ is provided with a light emission element $LED_L$ located between a power V and the ground for outputting the constant amount of light to the reflection plate 42 and with a light reception element $PT_L$ connected between the power V and the ground through a resistor $R_{1L}$ for inputting the reflected light from the reflection plate 42. The light reception element $PT_L$ is made from a photo transistor, the amount of current which flows therethrough depending on the amount of reflected light being input. A voltage signal where the voltage is proportional to the amount of reflected light being input is output to the sensor control circuit 59.

The sensor control circuit 59 is provided with an amplifier $AMP_L$ wherein a threshold voltage $V_{TH}$ which is determined by a terminal $A_L$ of the sensor $41_L$ and resistors $R_{2L}$ and $R_{3L}$ between the power V and the ground is input and when the voltage from the sensor $41_L$ is higher than the voltage $V_{TH}$, a high level signal is output. A one-shot multivibrator $MB_L$ is provided where the output from the amplifier $AMP_L$ is input as a trigger through a NOT circuit and with a constant time delay determined by a condenser $C_{TL}$ and a resistor $R_{TL}$ by the trigger, the signal being output from an output terminal $OUT_L$ is inverted. Likewise, the sensor $41_R$ is connected to an amplifier $AMP_R$ and a multivibrator $MB_R$. Between the multivibrators $MB_L$ and $MB_R$, a terminal CAR is provided so as to selectively operate one of sensors $41_L$ and $41_R$ along with the NOT circuit. The terminals CAR, $OUT_R$, and $OUT_L$ are connected to the CPU 51.

FIG. 12 is a flowchart showing an operation of the printer in the structure described above. When a print command is input, the flow (namely, the program) gets started.

In step step S1, the program travels the carriage 45 to the most left position in the movable range where a paper 49 is absent. In step S2, the program starts traveling the carriage 45 in the right direction, which is the printing direction at a constant speed. In step S3, the CPU 51 outputs a signal from the terminal CAR so as to causing the sensor $41_R$ to be active. At the time, the light emission element $LED_R$ of the sensor $41_R$ outputs the constant amount of light to the reflection plate 42.

In step S4, reflected light in an alternately changing state where high level light whose light amount is large and low level light whose light amount is small are alternately reflected from the bright stripes 42a and the dark stripes 42b on the reflection plate 42 is input to the light reception element $PT_R$. After the reflected light is input, the sensor $41_R$ outputs alternately changing signals where signal levels are alternately changed between a high level and a low level as shown in FIG. 13 (*b*) to the sensor control circuit 59. The signals are input and triggered to the multivibrator $MB_R$ as pulse signals whose waveforms are trimmed by the amplifier $AMP_R$ where the threshold voltage $V_{TH}$ is applied. The multivibrator $MB_R$ inverts the output signals with the constant time delay determined by the condenser $C_{TR}$ and the resistor $R_{TR}$ depending on the leading triggers. However, since the alternately changing signals have been input, the multivibrator $MB_R$ are successively reset, whereby the output signals are not inverted. Therefore, while the CPU 51 continuously inputs signals in a constant level from the terminal $OUT_R$, it determines that the paper is absent.

In step S5, the program determines whether the light reception element $PT_R$ has input reflected light in the constant state. When reflected light in the alternately changing state has been continuously input, the determined condition becomes NO in step S5. The program advances to step S6. In step S6, the program determines whether the carriage 45 has been located at the right end of the movable range. When the determined condition is NO, the program returns back to step S5. When the determined condition is YES in step S6, the program determines that the paper has not been loaded on the platen 43 and terminates the flow.

When the determined condition is YES in step S5, namely, the paper 49 has been loaded on the platen 43, it blocking a part of the reflection plate 42 as shown in FIG. 14 (*a*) and the sensor $41_R$ has been traveled to an opposed position of the paper 49, the constant level of reflected light corresponding to the reflection factor of the paper 49 is input to the light reception element $PT_R$. When the reflection factor of the paper 49 is comparatively high, namely, white, the sensor $41_R$ outputs a signal shown in FIG. 14 (*b*) to the sensor control circuit 59. When the reflection factor of the paper 49 is comparatively low, namely, dark, the sensor $41_R$ outputs a signal shown in FIG. 14 (*c*) to the sensor control circuit 59. When the input signals to the multivibrator $MB_R$ are changed from the alternately changing signals to the constant signals, the signals which are output from the terminal $OUT_R$ to the CPU 51 are inverted with the constant time delay after the leading trigger which has been last input. In step S8, the CPU 51 determines that the opposite position of the sensor $41_R$ is the left end of the non-transparent paper by the inversion of the signals. In step S9, the left margin which is the print start position is set in accordance with the left end position. In step S10, the printing starts from the left margin. In step S11, the program determines whether the light reception element $PT_R$ has input the reflected light in the alternately changing state or not. This step is continued until the determined condition becomes YES. In step S11, when the determined condition becomes YES, the program advances to step S12 so as to detect the right end of the paper 49. After that, the right margin which is a print end position in accordance with the right end position is set. In step S14, the printing stops at the right margin position. In step S15, the program determines whether the printed line is the last line or not. When the determined condition is NO, the program returns back to step S1. When the determined condition is YES, the program terminates the flow.

In the above flow, the left and right end detection operations in printing operations have been described. In the printer, the paper 49 is also detected in an initial setting state such that the power is turned on. At the time, the steps S1, S2, S3, S4, S5, S6, S7, S8, S11, and S12 in the above flow are executed.

In addition, the printer can also detect the top end and bottom end of the paper 49. In other words, when the paper is fed, the carriage 45 is traveled near the center of the platen 42 and it is reciprocatively traveled in the manner that the sensors $41_R$ or $41_L$ traveled several dark stripes 42*a* and dark stripes 42*b* on the reflection plate 42. In this state, when the paper 49 is fed between the sensors $41_R$ and $41_L$ and the opposed reflection plate 42 in accordance with a paper feed operation signal, the reflected light in the alternately changing state is changed to the constant state. When the reflected light in the constant state is received, the top end of the paper 49 can be detected. The bottom end of the paper 49 can be also detected in the same operation.

In the printer according to the present embodiment, any tone color paper can be also detected besides white papers. In addition, since the printer detects the left end and the right end of the paper 49 whenever each line is printed, it does not print blank characters on the platen 43. Thus, this paper detector apparatus is particularly useful for ink jet type printers which print dark characters and deform the surface of the platen 43.

As describe above, according to the third embodiment of the present invention, the carriage and platen are traveled along the reflection plate. When reflected light which is not in the alternately changing state representing that a paper has been loaded is input to the sensor of light reflection type, the control means determines that the paper is present, whereby various types of papers can be detected besides white papers.

In the third embodiment of the present invention, any tone color paper can be also detected besides white papers. In addition, since the printer detects the left end and the right end of the paper 49 whenever each line is printed, it does not print blank characters on the platen 43. Thus, this paper detector apparatus is particularly useful for ink jet type printers which print dark characters and deform the surface of the platen 43.

In the third embodiment of the present invention; non-transparent papers could be detected. However, it is also possible to detect transparent papers such as OHP papers. In this case, a pair of amplifiers where threshold voltages $V_{TL}$ are applied is provided besides the amplifiers $AMP_R$ and $AMP_L$ where threshold voltages $V_{TH}$ are applied. A pair of multivibrators same as the multivibrators $MB_R$ and $MB_L$ is connected to the amplifiers and the output terminals are connected to the CPU 51.

An OHP paper is loaded on the platen 43 and the flow shown in FIG. 12 is executed. In S5, reflected light in a second alternately changing state where second high level light which is transmitted through the OHP paper and reflected from the bright stripes 42*a* on the reflection plate 42 and which is slightly weaker than the high level light and second low level light which is reflected from the OHP paper which is on the front side of the dark stripes 42*b* and which is slightly stronger than the low level light are alternately changed is input to the right reception element $PT_R$ of the sensor $41_R$. When the reflected light is input, the sensor $41_R$ outputs the second alternately changing signals where the second high level and the second low level are continuously changed to the control circuit 59. The second high level is higher than the threshold voltage $V_{TH}$ and the second low level is lower than the threshold voltage $V_{TL}$. The sensor control circuit 59 outputs the reversed signals relating to the threshold voltage $V_{TH}$ and the constant level signals relating to the threshold voltage $V_{TL}$ to the CPU 51. With these signals, the CPU 51 detects the left end of the transparent paper. In S12, the program detects the right end of the transparent paper.

In the third embodiment described above, the printing was conducted only in the right direction. It is also possible to conduct the printing both in the right and left directions. The sensor $41_R$ and the sensor $41_L$ are used to detect the printing in the right direction and that in the left direction, respectively, whereby the ends of a paper can be detected before starting the printing.

In the third embodiment described above, the printing was made by the print head 44 on a paper. It is also possible to proved a read head on the carriage 45 so as to read characters on the paper 49.

In the third embodiment described above, the reflection plate 42 was provided independently from the platen 43. Using a flat metal plate such as aluminum, bright stripes and dark stripes can be formed, thereby obtaining the same good result as the embodiment described above. In this case, as practical means for forming the bright stripes and dark stripes, they are printed at positions on the opposite sides of the sensors $41_R$ and $41_L$ using plate-resisting resist ink by silk screen printing method and the like. After that, the surface of the aluminum platen is dark-oxidized. After that, by removing the resist ink using a solvent, the portion where the resist ink was printed and removed becomes the bright stripes and the remaining portion becomes the dark stripes.

In the third embodiment described above, the bright stripes 42*a* and the dark stripes 42*b* were regularly formed in an equal width. However, when the width of the bright stripes (X) and that of the dark stripes (Y) are set in the range of $X<Y<3X$ to 5Y, the output levels of the light reception elements $PT_R$ and $PR_L$ can be changed more remarkably than those of the embodiment described above. Moreover, the shapes of the bright stripes and dark stripes are not limited to vertical stripes disposed in parallel. It is sufficient to detect changes of output levels exceeding a predetermined width as the sensors $41_R$ and $41_L$ travel along the reflection surface. Therefore, as means for forming the bright stripes and the dark stripes, they can be painted on the surface of the reflection plate 42. On a metal surface, by forming rough portions which diffusely relfect light, the same effect as the paint described above can be obtained. In this case, as a machining method, although it is possible to form diffusely reflecting portions by a chemical etching method, part of metal can be regularly dented by a press machining method using a mold having shapes for bright stripes and dark stripes, thereby obtaining the same result.

In the third embodiment described above, the bright stripes and the dark stripes were formed on an aluminum plate. However, it is also possible to form them using a slit plate which has stripe shape holes disposed in a regular interval and a rubber sponge which is provided on the rear position thereof, the slit plate and the rubber sponge having a high reflection factor and a low reflection factor, respectively.

It is still also possible in the third embodiment that the reflection member ia substituted by a board member which has a plurality of slits at predetermined intervals, and the sensor of light reflection type is substituted by a sensor of light transmission type.

As described above, according to the first, second and third embodiments of the present invention, a paper is detected to be present or absent regardless of what type of paper is used in the recording apparatus; namely, besides conventional white papers, high tone color papers, dark papers, and transparent OHP paper can be used.

Although in the first and second embodiments, the reference value storage means stored the reference values to be compared with the output values from the first and second sensors, it is also possible to cause reference values of constant voltages to be provided by an electric circuit.

Although three embodiments of the invention have been illustrated in the accompanying drawings and described in the foregoing "Description of the Embodiments", it will be understood that the invention is not limited to the embodiment disclosed, but is capable of numerous rearrangements, modifications and substitutions without departing from the scope of the invention.

What is claimed is:

1. A sheet detection apparatus comprising:

at least two light radiation means for outputting a predetermined amount of light;

at least two sensor means provided at positions on one side of a sheet feed path for receiving the light from said two light radiation means by way of a sheet;

at least two reflection members provided on the side of said sheet feed path opposite to said two sensor means, each respectively for reflecting the light from one of said two radiation means to one of said two sensor means in the absence of a sheet on said path detection means for detecting whether one of various types of sheets is present on said path as well as the type thereof by comparing output values from said two sensor means with predetermined reference values.

2. The sheet detection apparatus according to claim 1, wherein said two reflection members are so arranged as to be capable of reflecting the light to said two sensor means over a range which a movable carriage means spans across said sheet.

3. The sheet detection apparatus according to claim 2, wherein said two sensor means are provided on said carriage means, and said determination means determines positions of left and right ends of said sheet by comparing said output values with said predetermined reference values.

4. The sheet detection apparatus according to claim 1, wherein said two reflection members comprise a first reflection member and a second reflection member, and a reflection surface of said first reflection member has a higher reflection factor than that of a surface of a first predetermined sheet, and a reflection surface of said second reflection member has a lower reflection factor than that of a surface of a second predetermined sheet.

5. The sheet detecting apparatus according to claim 4, wherein said first predetermined sheet is a white sheet, and said second predetermined sheet is a transparent sheet.

6. The sheet detection apparatus according to claim 5, wherein said two sensor means comprise a first sensor of light reflection type and a second sensor of light reflection type, each of which corresponds to one of said two light radiation means, respectively;

said first and second sensors output a first and a second output value, respectively;

one of said predetermined reference values is a first predetermined reference value, another is a second predetermined reference value;

said first predetermined reference value is set in the range between an output value at which said first sensor defects said first reflection member and that at which it detects said first predetermined sheet; and said second predetermined reference value is set in the range between an output value at which said second sensor detects said second reflection member and that at which it detects said second predetermined sheet.

7. The sheet detection apparatus according to claim 6, wherein a sheet is determined to be absent when said first output value is higher than said first predetermined reference value and said second output value is lower than said second predetermined reference value;

said sheet is determined to be a white sheet when said first output value is lower than said first predetermined reference value and said second output value is higher than said second predetermined reference value; and said sheet is determined to be a dark sheet when said first output value is lower than said first predetermined reference value and said second output value is lower than said second predetermined reference value.

8. The sheet detection apparatus according to claim 6, wherein a sheet is determined to be absent when said first output value is higher than said first predetermined reference value and said second output value is lower than said second predetermined reference value; and said sheet is determined to be a transparent sheet when said first output value is higher than said first predetermined reference value and said second output value is higher than said second predetermined reference value.

9. A sheet detection apparatus comprising:

at least two light radiation means for outputting a predetermined amount of light;

at least two sensor means provided at positions on one side of a sheet feed path for receiving the light from said radiation means by way of a sheet on said path;

a reflection member provided on the side of said sheet feed path opposite to said two sensor means, said reflection member reflects the light from said two sensor means; and detection means for detecting whether one of various types of sheets is present on said sheet feed path as well as the type thereof by comparing output values from said two sensor means with predetermined reference values.

10. The sheet detecting apparatus according to claim 9, wherein a reflection surface of said reflection member has a lower reflection factor than that of a surface of a predetermined sheet.

11. The sheet detecting apparatus according to claim 10, wherein said predetermined sheet is a transparent sheet.

12. The sheet detecting apparatus according to claim 9, wherein said two sensor means comprise a first sensor of light reflection type which corresponds to one of said light radiation means and a second sensor of light transmission type; said output values from said first sensor and said second sensor being first and a second output values, respectively.

13. The sheet detecting apparatus according to claim 12, wherein said predetermined reference values comprise a first predetermined reference value and a second predetermined reference value; said first predetermined reference value is set in the range between an output value at which said first sensor detects said one of said reflection member and that at which said second sensor detects said predetermined sheet; and said second predetermined reference value is set in the range between an output value at which said second sensor detects a non-transparent type sheet and that at which it detects no sheet.

14. The sheet detection apparatus according to claim 13, wherein said sheet is determined to be absent when said first output value is lower than said first predetermined reference value and said second output value is higher than said second predetermined reference value;

said sheet is determined to be a white sheet when said first output value is higher than said first predetermined reference value and said second output value is lower than said second predetermined reference value; and said sheet is determined to be a dark sheet when said first output value is lower than said first predetermined reference value and said second output value is lower than said second predetermined reference value.

15. The sheet detection apparatus according to claim 13, wherein said sheet is determined to be absent when said first output value is lower than said first predetermined reference value and said second output value is higher than said second predetermined reference value; and said sheet is determined to be a transparent sheet when said first output value is higher than said first predetermined reference value and said second output value is higher than said second predetermined reference value.

16. A sheet detection apparatus comprising:

light radiation means for outputting a predetermined amount of light;

sensor means provided at a position on one side of a sheet feed path for receiving the light from said light radiation means by way of a sheet on said sheet feed path;

a reflection member provided on the opposite side of said sheet feed path from said sensor means, said reflection member being alternately formed with portions of high and low reflection factors;

carriage means carrying said sensor means and adapted to travel transversely with respect to said sheet feed path, wherein in the absence of a sheet on said path the reflected light inputted to said sensor is in an alternately changing state of high and low level when said carriage means travels across said sheet path; and detection means for detecting whether one of various types of sheets is in present on said path as well as the type thereof based upon said reflected light inputted to said sensor means.

17. The sheet detecting apparatus according to claim 16, wherein said sensor means comprises a sensor of light reflection type, and said sheet is determined to be absent when said carriage means travels and the input state of said sensor is in said alternately changing state;

non-transparent sheet is determined to be in existence when said carriage means is traveled and the input state of said sensor is in a constant state where reflected light in a constant level is continuously present.

18. The sheet detection apparatus according to claim 17, wherein it is determined that a position opposite to said sensor is an end of said non-transparent sheet when said carriage means travels and the input state of said sensor is switched between said alternately changing state and said constant state.

19. The sheet detection apparatus according to claim 16, wherein said sensor is a sensor of light reflection type, and said sheet is determined to be absent when said carriage means travels and the input state of said sensor is in said alternately changing state;

it is determined that non-transparent sheet is in existence when said carriage means travels and the input state of said sensor is in a constant state where reflected light in a constant level is continuously present; and it is determined that a transparent sheet is in existence when said carriage means is traveled and the reflected light in a second alternately changing state where one of said high level and a second high level which is weaker than thereof in the amount of light and one of said low level and a second low level which is stronger than thereof in the amount of light is alternately changed is inputted to said sensor.

20. The sheet detection apparatus according to claim 19, wherein it is determined that a position opposite to said sensor is an end of said non-transparent sheet when said carriage means travels and the input state of said sensor is switched between said alternately changing state and said second alternately changing state.

* * * * *